United States Patent
Sugihara et al.

(10) Patent No.: US 12,362,077 B2
(45) Date of Patent: Jul. 15, 2025

(54) CONNECTION STRUCTURE OF CARBON NANOTUBE WIRE

(71) Applicant: FURUKAWA ELECTRIC CO., LTD., Tokyo (JP)

(72) Inventors: Kazuki Sugihara, Tokyo (JP); Hideki Aizawa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 465 days.

(21) Appl. No.: 17/933,752

(22) Filed: Sep. 20, 2022

(65) Prior Publication Data

US 2023/0014073 A1    Jan. 19, 2023

Related U.S. Application Data

(63) Continuation of application No. PCT/JP2021/013829, filed on Mar. 31, 2021.

(30) Foreign Application Priority Data

Mar. 31, 2020 (JP) .................................. 2020-065007

(51) Int. Cl.
    *H01B 1/04*    (2006.01)
(52) U.S. Cl.
    CPC ..................................... *H01B 1/04* (2013.01)
(58) Field of Classification Search
    CPC ... H01B 1/02; H01B 1/04; H01B 1/24; H01B 7/02; H01B 13/062; H01R 4/18; H01R 4/183

(Continued)

(56) References Cited

U.S. PATENT DOCUMENTS

| 7,750,240 B2* | 7/2010 | Jiang ................... H01B 13/0162 |
| | | 174/103 |
| 8,445,788 B1* | 5/2013 | Tsotsis ..................... H01B 1/24 |
| | | 174/126.1 |

(Continued)

FOREIGN PATENT DOCUMENTS

| JP | 5135620 B2 | 11/2012 |
| JP | 5131571 B2 | 1/2013 |

(Continued)

OTHER PUBLICATIONS

International Search Report and Written Opinion (English Translation for ISR only) mailed on Jun. 29, 2021 for International Patent Application No. PCT/JP2021/013829, pp. all.

(Continued)

*Primary Examiner* — William H. Mayo, III
(74) *Attorney, Agent, or Firm* — Dorsey & Whitney LLP

(57) ABSTRACT

A connection structure of a carbon nanotube wire includes a joint between the carbon nanotube wire and the connection target. For example, a connection structure of a carbon nanotube wire includes a carbon nanotube wire, and, a connection target to which the carbon nanotube wire is connected. The connection structure further includes a conducting wire with higher solder wettability than the carbon nanotube wire, a penetrating part of the conducting wire formed along a cross section having a component orthogonal to a longitudinal direction of the carbon nanotube wire, and solder that connects the carbon nanotube wire and the connection target. The solder penetrates the penetrating part formed along the conducting wire.

14 Claims, 5 Drawing Sheets

(58) Field of Classification Search
USPC .................. 174/74 R–88 R, 126.1, 126.2
See application file for complete search history.

(56) References Cited

U.S. PATENT DOCUMENTS

| | | | |
|---|---|---|---|
| 9,111,658 B2* | 8/2015 | Shah | H01B 1/24 |
| 9,193,586 B2* | 11/2015 | Wei | H01B 7/30 |
| 9,685,258 B2* | 6/2017 | Silverman | H02G 15/02 |
| 2004/0020681 A1* | 2/2004 | Hjortstam | H02K 3/02 |
| | | | 174/102 SC |
| 2005/0006801 A1 | 1/2005 | Kinloch et al. | |
| 2007/0284987 A1* | 12/2007 | Liu | H01J 29/481 |
| | | | 313/311 |
| 2008/0170982 A1* | 7/2008 | Zhang | C01B 32/154 |
| | | | 423/447.3 |
| 2008/0251270 A1* | 10/2008 | Lee | H01B 11/1817 |
| | | | 174/105 R |
| 2008/0283267 A1* | 11/2008 | Werth | H01B 1/04 |
| | | | 977/932 |
| 2009/0173516 A1* | 7/2009 | Burke | H10D 62/118 |
| | | | 977/750 |
| 2010/0000754 A1* | 1/2010 | Mann | H01B 11/06 |
| | | | 174/34 |
| 2010/0101828 A1* | 4/2010 | Duarte Pena | C09D 179/08 |
| | | | 977/734 |
| 2011/0005808 A1* | 1/2011 | White | H01F 5/00 |
| | | | 165/185 |
| 2012/0090866 A1* | 4/2012 | Gundel | H01B 7/188 |
| | | | 174/34 |
| 2012/0125656 A1* | 5/2012 | Wei | H01B 1/02 |
| | | | 977/932 |
| 2013/0048337 A1* | 2/2013 | Hemond | H01B 1/04 |
| | | | 977/932 |
| 2013/0233595 A1* | 9/2013 | Cooper | H01B 1/04 |
| | | | 174/126.1 |
| 2013/0251619 A1 | 9/2013 | Rikihisa et al. | |
| 2014/0039309 A1 | 2/2014 | Harris et al. | |
| 2014/0046291 A1 | 2/2014 | Harris et al. | |
| 2014/0084219 A1 | 3/2014 | Zhao et al. | |
| 2014/0224524 A1* | 8/2014 | Gazda | H01B 1/04 |
| | | | 174/126.2 |
| 2014/0346697 A1 | 11/2014 | Rikihisa et al. | |
| 2014/0363669 A1 | 12/2014 | Otto et al. | |
| 2015/0147573 A1 | 5/2015 | Zhang et al. | |
| 2015/0308018 A1 | 10/2015 | Zhang et al. | |
| 2016/0083872 A1 | 3/2016 | Zhang et al. | |
| 2016/0135687 A1 | 5/2016 | Harris et al. | |
| 2016/0251778 A1 | 9/2016 | Zhang et al. | |
| 2016/0273133 A1 | 9/2016 | Zhang et al. | |
| 2016/0312387 A1 | 10/2016 | Zhang et al. | |
| 2017/0001866 A1 | 1/2017 | Zhang et al. | |
| 2017/0096750 A1 | 4/2017 | Zhang et al. | |
| 2017/0137290 A1 | 5/2017 | Zhang et al. | |
| 2018/0240569 A1* | 8/2018 | Richmond | H01B 7/02 |
| 2019/0002283 A1 | 1/2019 | Zhang et al. | |

FOREIGN PATENT DOCUMENTS

| | | |
|---|---|---|
| JP | 2013047402 A | 3/2013 |
| JP | 5288359 B2 | 6/2013 |
| JP | 5350635 B2 | 8/2013 |
| JP | 5590603 B2 | 8/2014 |
| JP | 2014530964 A | 11/2014 |
| JP | 5819888 B2 | 10/2015 |
| JP | 5990202 B2 | 8/2016 |
| JP | 2017171546 A | 9/2017 |
| JP | 2017174689 A | 9/2017 |
| JP | 2017183281 A | 10/2017 |
| JP | 2018186071 A | 11/2018 |
| JP | 2019067657 A | 4/2019 |

OTHER PUBLICATIONS

[English Translation] Written Opinion for International Patent Application No., PCT/JP2021/013829 dated Jun. 29, 2021, pp. all.
International Preliminary Report on Patentability for International Patent Application No. PCT/JP2021/013829 dated Sep. 29, 2022, pp. all.

* cited by examiner

CONNECTION STRUCTURE OF CARBON NANOTUBE WIRE

CROSS REFERENCE TO RELATED APPLICATIONS

The present application is a continuation application of International Patent Application No. PCT/JP2021/013829 filed on Mar. 31, 2021, which claims the benefit of Japanese Patent Application No. 2020-065007, filed on Mar. 31, 2020. The contents of these applications are incorporated herein by reference in their entirety.

BACKGROUND

Technical Field

The present disclosure relates to a carbon nanotube wire and a connection structure for connecting the carbon nanotube wire to a connection target.

Background

Carbon nanotubes (hereinafter may also be referred to as "CNTs") are materials having various characteristics and are expected to be applied in many fields. Since CNTs are lightweight and excellent in various characteristics such as electrical conductivity, thermal conductivity and mechanical strength, CNTs are expected to be applied, for example, to wires as an alternative to metal wires in applications such as electric wires.

When used as wires, carbon nanotube wires (hereinafter may also be referred to as "CNT wires") need to be made longer. However, lengthening of the CNT wires requires a high-level technique. As a technique of lengthening conventional CNT wires, it is proposed to make carbon nanotubes grown from each carbon nanotube yarn entangled with the carbon nanotube yarn on another side of connection and/or the grown carbon nanotubes, and cause the carbon nanotube yarns to be mutually connected, thus making it possible to lengthen the carbon nanotube wires (Japanese Patent Application Publication No. 2013-47402).

However, according to Japanese Patent Application Publication No. 2013-47402, in order to make the carbon nanotubes grow from the carbon nanotube yarn, it is necessary to apply a catalyst solution to a region where the carbon nanotube yarns are mutually connected, thereby cause the carbon nanotubes to grow and make them entangled with the carbon nanotube yarns on the other side of connection, but the problem is that such connection work is complicated and the use of the catalyst solution makes it difficult to perform positional control over the region where the carbon nanotube yarns are mutually connected.

As described above, since the CNTs demonstrate excellent conductivity, and so the CNT wires are expected to be applied in applications such as electric wires, and connection destinations are assumed to be not only the CNT wires but also substrates such as circuit substrates. However, Japanese Patent Application Publication No. 2013-47402 describing that carbon nanotubes are made to grow and entangled with the carbon nanotube yarn on the other side of connection involves a problem that when the connection destination is other than the CNT wire, it is not possible to form any connection body.

On the other hand, when a metal wire is connected to a connection target, the metal wire and the connection target may be connected by soldering since connection work is simple and connection strength can be acquired as well. However, the CNT wire is inferior in solder wettability compared to the metal wire, and particularly when the CNT wire is a stranded wire in which the elemental wire made up of a carbon nanotube aggregate is stranded together, it is difficult for solder to penetrate into the CNT wire, showing a problem with conductivity and strength of the joint.

Thus, when the CNT wire is connected to the connection target by soldering, the CNT wire needs to be subjected to hydrophilic processing or roughening treatment in advance. Therefore, when the CNT wire is soldered, there is a problem that the connection work is still complicated.

SUMMARY

The present disclosure has been made in view of the above-described circumstances, and it is an object of the present disclosure to provide a connection structure of a carbon nanotube wire that allows the carbon nanotube wire to be connected to a connection target at a desired region with simple operation, with a joint between the carbon nanotube wire and the connection target having excellent electrical connectivity and mechanical connectivity.

The gist of a configuration of the present disclosure is as follows.

[1] A connection structure of a carbon nanotube wire, including:
  a carbon nanotube wire formed by twisting and bundling carbon nanotube aggregates;
  a connection target to which the carbon nanotube wire is connected;
  a conducting wire with higher solder wettability than the carbon nanotube wire;
  a penetrating part of the conducting wire formed along a cross section having a component orthogonal to a longitudinal direction of the carbon nanotube wire; and
  solder that connects the carbon nanotube wire and the connection target; in which
  the solder penetrates the penetrating part formed along the conducting wire.

[2] The connection structure of a carbon nanotube wire according to [1], in which the connection target is a conductive member.

[3] The connection structure of a carbon nanotube wire according to [2], in which the conductive member is a substrate comprising a metal member or another carbon nanotube wire.

[4] The connection structure of a carbon nanotube wire according to any one of [1] to [3], in which part of the conducting wire protrudes from a part of the carbon nanotube wire not facing the connection target.

[5] The connection structure of a carbon nanotube wire according to any one of [1] to [4], in which
  the connection target is another carbon nanotube wire,
  the connection structure of a carbon nanotube wire includes a joint where an outer circumferential surface of one end portion of the carbon nanotube wire is in contact with an outer circumferential surface of one end portion of the other carbon nanotube wire, in which
  in the joint, the penetrating part of the conducting wire is formed along a cross section having a component orthogonal to a longitudinal direction of the carbon nanotube wire and the other carbon nanotube wire.

[6] The connection structure of a carbon nanotube wire according to any one of [1] to [4], in which at least part of the conducting wire other than a region located at the penetrating part is wound around a perimeter of the carbon nanotube wire.

[7] The connection structure of a carbon nanotube wire according to [5], in which at least part of the conducting wire other than a region located at the penetrating part is wound around the perimeters of the carbon nanotube wire and the other carbon nanotube wire.

[8] The connection structure of a carbon nanotube wire according to any one of [1] to [7], in which a ratio of the cross-sectional area of the conducting wire at the penetrating part to the cross-sectional area of the carbon nanotube wire on a cross section having a component orthogonal to the longitudinal direction of the carbon nanotube wire is 5% or more and 99% or less.

According to an aspect of the connection structure of a carbon nanotube wire of the present disclosure, the penetrating part of the conducting wire with high solder wettability formed along a cross section having a component orthogonal to the longitudinal direction of the carbon nanotube wire, which is a stranded wire is provided, and solder penetrates the penetrating part along the conducting wire, and so it is possible to easily create a region with high solder wettability (that is, the penetrating part of the conducting wire) inside the region surrounded by a surface of the carbon nanotube aggregate at the penetrating part of the carbon nanotube wire, which is the stranded wire and the surface of the conducting wire. Therefore, the solder flows into the carbon nanotube wire along the penetrating part of the conducting wire, the solder, the conducting wire and the connection target are connected firmly together, and as a result, the carbon nanotube wire and the connection target are connected firmly together. From above, in the connection structure of a carbon nanotube wire of the preset disclosure, the carbon nanotube wire can be connected to the connection target at a desired region with simple operation and it is possible to obtain a connection structure of a carbon nanotube wire with the joint between the carbon nanotube wire and the connection target having excellent electrical connectivity and mechanical connectivity.

According to an aspect of the connection structure of a carbon nanotube wire of the present disclosure, part of the conducting wire protrudes from a part of the carbon nanotube wire not facing the connection target, and so the protruding part of the conducting wire allows solder to smoothly flow into the carbon nanotube wire.

According to an aspect of the connection structure of a carbon nanotube wire of the present disclosure, the winding part where at least part of the conducting wire other than the region located at the penetrating part is wound around the perimeter of the carbon nanotube wire is included, and so the solder accumulates in the winding part. Therefore, solder is surely applied to the desired joint and in the vicinity, allowing the solder to flow into the carbon nanotube wire more smoothly. Moreover, since the solder is more likely to accumulate at the winding part, it is possible to prevent the solder from spreading wetly in regions other than the desired joint and in the vicinity.

According to an aspect of the connection structure of a carbon nanotube wire of the present disclosure, the ratio of the cross-sectional area of the penetrating part to the cross-sectional area of the carbon nanotube wire is 5% or more and 99% or less, and the solder can more reliably flow into the carbon nanotube wire, which more reliably improves connection reliability between the carbon nanotube wire and the connection target.

DETAILED DESCRIPTION

Figure 1:
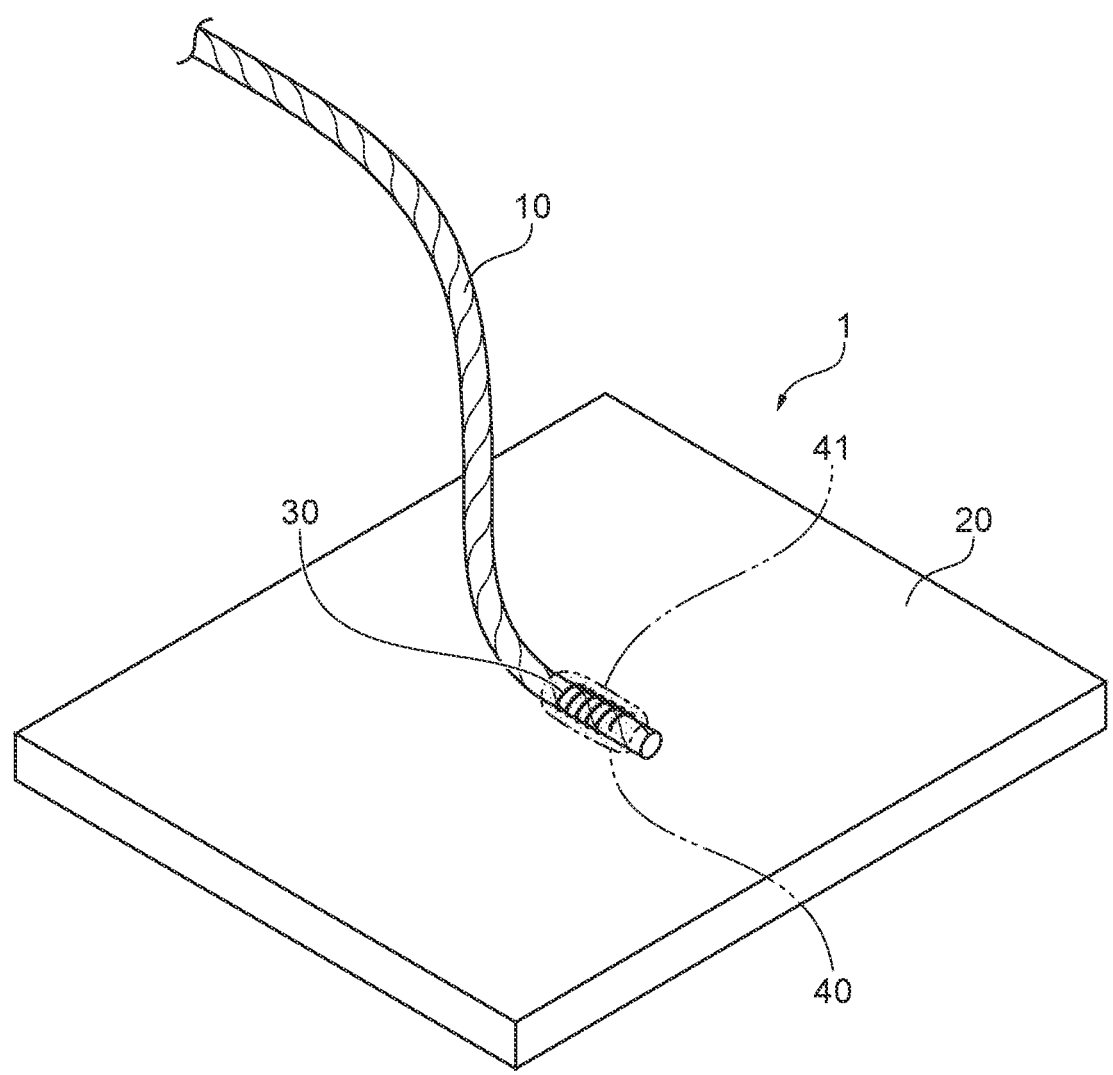
FIG. 1 is an explanatory view of a connection structure in which a carbon nanotube wire, a connection structure according to a first embodiment of the present disclosure, is connected to a substrate.
Figure 2:
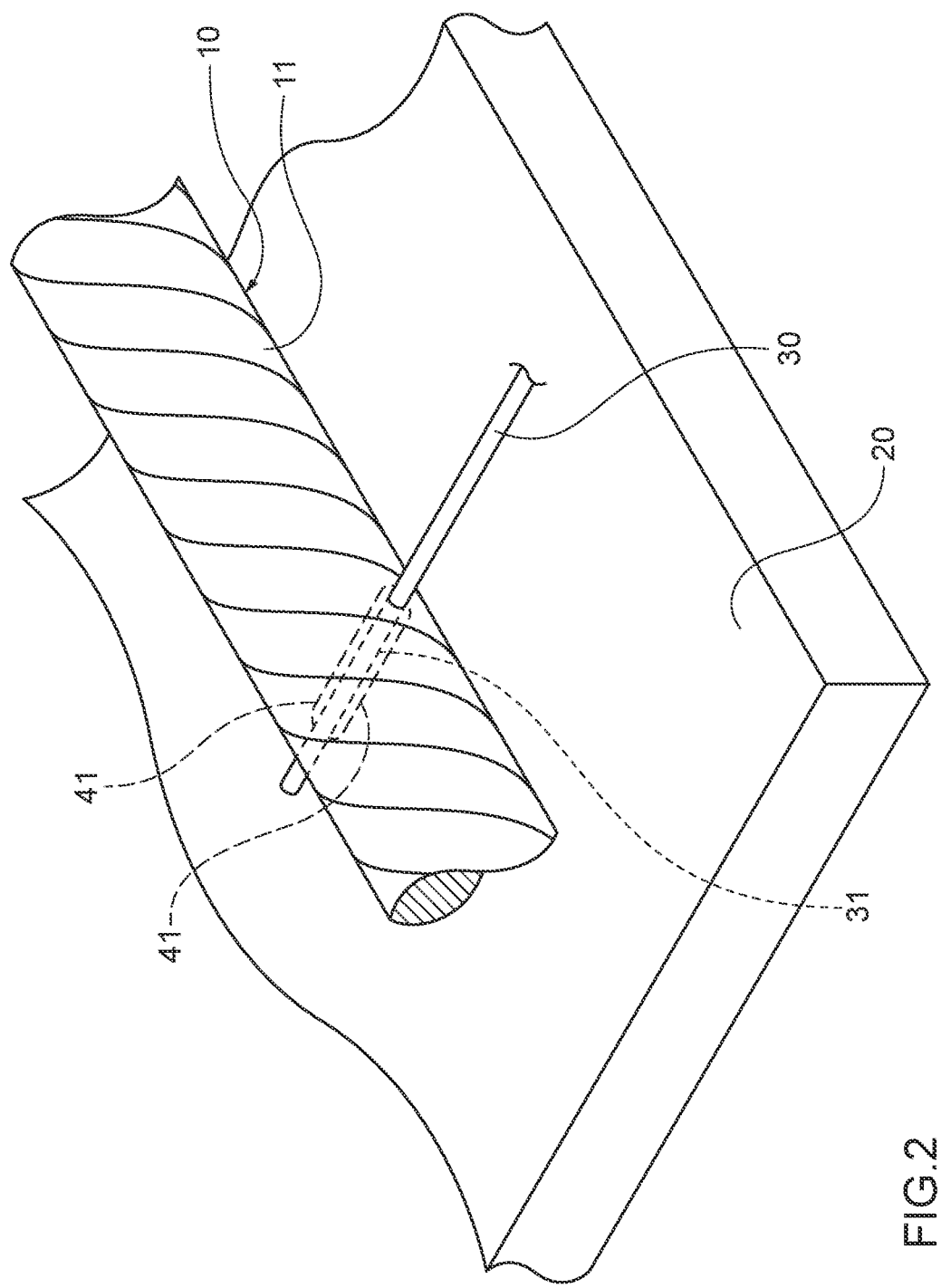
FIG. 2 is an explanatory view illustrating that a penetrating part of a conducting wire is formed in the carbon nanotube wire to be used for the connection structure according to the first embodiment of the present disclosure.
Figure 3:
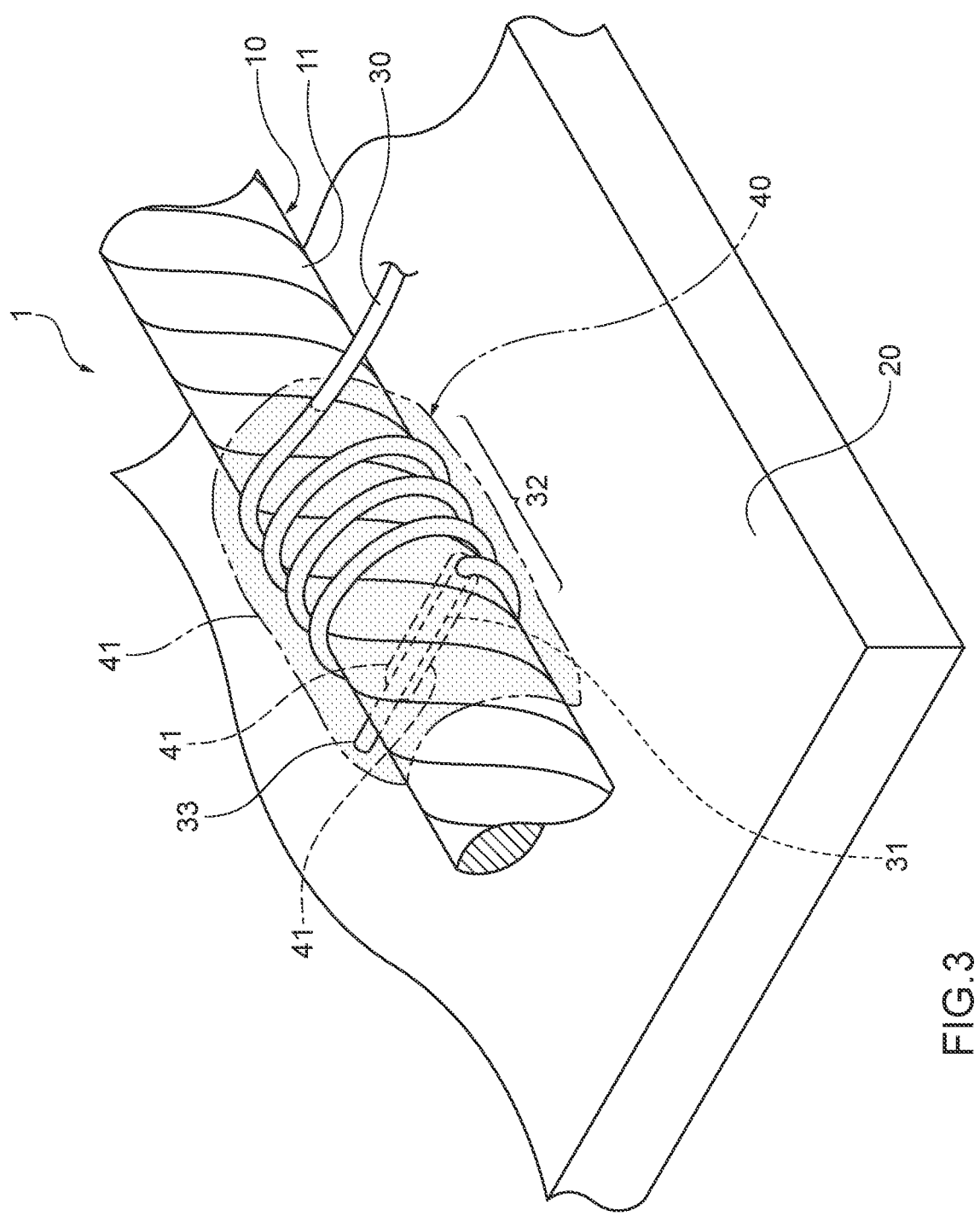
FIG. 3 is an explanatory view illustrating an aspect that a conducting wire is wound around a perimeter of the carbon nanotube wire in which a penetrating part of the conducting wire is formed, to be used for the connection structure according to the first embodiment of the present disclosure.

A connection structure of a carbon nanotube wire of the present disclosure will be described hereinafter. First, a connection structure of a carbon nanotube wire according to a first embodiment of the present disclosure will be described. Note that FIG. 1 is an explanatory view of a connection structure in which a carbon nanotube wire, a connection structure according to the first embodiment of the present disclosure, is connected to a substrate. FIG. 2 is an explanatory view illustrating that a penetrating part of a conducting wire is formed in the carbon nanotube wire to be used for the connection structure according to the first embodiment of the present disclosure. FIG. 3 is an explanatory view illustrating an aspect that a conducting wire is wound around a perimeter of the carbon nanotube wire in which a penetrating part of the conducting wire is formed, to be used for the connection structure according to the first embodiment of the present disclosure.

As shown in FIG. 1, the connection structure 1 of a carbon nanotube wire according to the first embodiment of the present disclosure is provided with a carbon nanotube wire (CNT wire) 10 formed by twisting and bundling carbon nanotube aggregates (hereinafter may also be referred to as "CNT aggregates") and a connection target to which the CNT wire 10 is connected. The connection target of the CNT wire 10 is a conductive member. In the connection structure 1 of a carbon nanotube wire, the connection target is a substrate 20 and examples of the substrate 20 include a substrate provided with a metal member such as a substrate made of metal and a circuit substrate.

In the connection structure 1 of a carbon nanotube wire, the vicinity of the end of the CNT wire 10 is connected to the substrate 20 and a joint 40 between the CNT wire 10 and the substrate 20 is formed. Solder 41 is used for connection between the CNT wire 10 and the substrate 20. Therefore, the solder 41 connects the CNT wire 10 and the substrate 20, which is a connection target, and the CNT wire 10 is soldered to the substrate 20.

The CNT wire 10 is formed by twisting a plurality of elemental wires composed of a carbon nanotube aggregate (CNT aggregate) formed of a plurality of carbon nanotubes (CNTs) having a layered structure with one or more layers. Therefore, the CNT wire 10 is a stranded wire formed by twisting and bundling elemental wires composed of CNT aggregates. Here, the CNT wire 10 means a CNT wire 10 with a CNT ratio of 90 mass % or more. Note that when calculating the CNT ratio in the CNT wire 10, plating and dopants are excluded. The longitudinal direction of the CNT aggregate forms a longitudinal direction of the CNT wire 10. Therefore, the CNT aggregate is linear. The plurality of CNT aggregates in the CNT wire 10 are arranged with their longitudinal axes nearly aligned. Therefore, the plurality of CNT aggregates in the CNT wire 10 are oriented.

As shown in FIG. 2, the connection structure 1 of a carbon nanotube wire is provided with a conducting wire 30 with higher solder wettability than the CNT wire 10 and a penetrating part 31 of the conducting wire 30 formed along a cross section orthogonal to a longitudinal direction of the CNT wire 10. The penetrating part 31 of the conducting wire 30 is formed along the cross section orthogonal to the longitudinal direction of the CNT wire 10 by causing the conducting wire 30 to penetrate the CNT wire 10 along a radial direction of the CNT wire 10. In the connection structure 1 of a carbon nanotube wire, the conducting wire 30 penetrates along a center line of the cross section orthogonal to the longitudinal direction of the CNT wire 10. Note that in the connection structure of a carbon nanotube wire according to the embodiment of the present disclosure, although the penetrating part 31 of the conducting wire 30 is formed on the cross section orthogonal to the longitudinal direction of the CNT wire 10 for convenience of explanation, the cross section is not limited to the cross section orthogonal to the longitudinal direction as long as the cross section has a component orthogonal to the longitudinal direction of the CNT wire 10.

From above, an extending direction of the penetrating part 31 of the conducting wire 30 is a direction substantially orthogonal to the longitudinal direction of the CNT wire 10. Since the CNT wire 10 is a stranded wire formed by twisting elemental wires composed of CNT aggregates, the conducting wire 30 can penetrate the CNT wire 10 by piercing the conducting wire 30 into the CNT wire 10 without the need to separately form a through hole or the like in the CNT wire 10. By piercing the conducting wire 30 into the CNT wire 10, a gap is formed between the CNT wire 10 and the conducting wire 30. In the connection structure 1 of a carbon nanotube wire, by piercing one conducting wire 30 into the CNT wire 10, one penetrating part 31 is formed. On the other hand, the penetrating part need not be a direction substantially orthogonal to the longitudinal direction of the CNT wire, and, for example, the conducting wire may be folded back in the CNT wire 10 and both ends of the conducting wire may protrude from any position of an outer circumference of the CNT wire 10. Therefore, the penetrating part 31 may be formed bent in the CNT wire 10. In the present embodiment, a structure in which solder flows into the CNT wire 10 (that is, a gap formed between an outer circumference of the conducting wire 30 and the CNT aggregate) may also be adopted as will be described later.

By piercing the conducting wire 30 into the CNT wire 10, a gap is also formed between the CNT wire 10 and the conducting wire 30, and so when the CNT wire 10 is soldered to the substrate 20, the solder 41 penetrates the penetrating part 31 along the conducting wire 30. That is, when the CNT wire 10 is soldered to the substrate 20, the solder flows into the gap formed between the outer circumference of the conducting wire 30 and the CNT wire 10, that is, along the inside of the CNT wire 10, and the solder 41 thereby penetrates the penetrating part 31. From above, a direction in which the solder 41 is formed is a direction substantially orthogonal to the longitudinal direction of the CNT wire 10. Note that FIG. 2 also illustrates the solder 41 applied to the penetrating part 31 when the CNT wire 10 is soldered to the substrate 20 for convenience of explanation of the connection structure 1 of a carbon nanotube wire.

As shown in FIG. 3, at least part of the conducting wire 30 other than the region located at the penetrating part 31 in the joint 40 is wound around the outer circumferential surface 11 of the CNT wire 10 along the circumferential direction and a winding part 32 is formed. From above, the penetrating part 31 of the conducting wire 30 and the winding part 32 are mutually continuous. The winding part 32 is provided in the vicinity of the penetrating part 31. Note that the winding part 32 of the conducting wire 30 is provided so as to contact the outer circumferential surface 11 of the CNT wire 10. Since the penetrating part 31 of the conducting wire 30 and the winding part 32 wound along the circumferential direction of the CNT wire 10 are mutually continuous, the solder 41 is more likely to flow into the CNT wire 10, and the connection strength between the CNT wire 10 and the substrate 20 improves.

Since the winding part 32 of the conducting wire 30 is formed, there is an aspect that part of the conducting wire 30 protrudes from a portion of the CNT wire 10 not facing the substrate 20. That is, the conducting wire 30 protrudes from the outer circumferential surface 11 of the CNT wire 10 at the winding part 32 of the conducting wire 30. In addition, in FIG. 3, there is an aspect that a tip portion 33 of the conducting wire 30 located at the penetrating part 31 extends outward from the outer circumferential surface 11 of the CNT wire 10 so that part of the conducting wire 30 protrudes from the portion of the CNT wire 10 not facing the substrate 20. When the connection target is the substrate 20, an end portion of the conducting wire 30 (tip portion 33) in which no penetrating part 31 is formed may be connected to the substrate 20 in advance by soldering or the like.

The number of turns of the conducting wire 30 of the winding part 32 is not particularly limited, and may be once or a plurality of times. Note that in FIG. 3, the number of turns of the conducting wire 30 is assumed to be 4 for convenience of explanation. In the winding part 32, the conducting wire 30 is wound along a circumferential direction of the CNT wire 10 at predetermined intervals in the longitudinal direction of the CNT wire 10. When the CNT wire 10 is soldered to the substrate 20, the winding part 32 has a function to store the solder 41. Note that FIG. 3 also illustrates the solder 41 which is applied when the CNT wire 10 is soldered to the substrate 20 in the connection structure of a carbon nanotube wire.

Examples of the conducting wire 30 with higher solder wettability than the CNT wire 10 include metal wires such as copper, silver, platinum and tungsten. The type of solder is not particularly limited if the solder can be used for connection of metal members and examples of such solder include Sn—Pb-based lead containing solder, lead-free solder such as Sn—Ag—Cu-based, Sn—Cu-based, Sn—Zn-based solder. The amount of the solder 41 to be applied to one penetrating part 31 is not particularly limited, but a lower limit value of the solder 41 is preferably 3.0 mg from a standpoint of improving tensile strength and electrical connectivity of the joint 40. On the other hand, an upper limit value of the solder 41 to be applied to one penetrating part 31 is preferably 20 mg from a standpoint of weight reduction, and particularly preferably 6.0 mg.

The diameter of the CNT wire 10 is not particularly limited, but it can be, for example, 20 μm to 1 mm. The number of twists of elemental wires of CNT that form the CNT wire 10 is not particularly limited, but it can be, for example, 2 to 2000. The diameter of the conducting wire 30 is not particularly limited, but it can be, for example, 10 μm or more and 1 mm or less.

According to the connection structure 1 of a carbon nanotube wire, the penetrating part 31 of the conducting wire 30 with high solder wettability formed along the cross section orthogonal to the longitudinal direction of the CNT wire 10, which is a stranded wire, is provided, the solder 41 penetrates the penetrating part 31 along the conducting wire 30, and it is thereby possible to easily create an inside with high solder wettability (that is, the gap formed between the outer circumference of the conducting wire 30 and the CNT wire 10) in the CNT wire 10. Therefore, when the CNT wire 10 is soldered to the substrate 20, the solder 41 flows into the CNT wire 10 along the penetrating part 31 of the conducting wire 30, that is, along the radial direction of the CNT wire 10, and the solder 41, the conducting wire 30 and the substrate 20 are firmly connected, and as a result, the CNT wire 10 and the substrate 20 are firmly connected. From above, in the connection structure 1 of a carbon nanotube wire, by selecting the position of the penetrating part 31 of the conducting wire 30 in the CNT wire 10 as appropriate, it is possible to firmly connect the CNT wire 10 and the substrate 20 at a desired region with simple operation. The connection structure 1 of a carbon nanotube wire can obtain a connection structure of a carbon nanotube wire in which the joint 40 between the CNT wire 10 and the substrate 20 has excellent electrical connectivity and mechanical connectivity.

In the connection structure 1 of a carbon nanotube wire, since part of the conducting wire 30 protrudes from a portion of the CNT wire 10 not facing the substrate 20, the protruding part of the conducting wire 30 allows the solder 41 to smoothly flow into the CNT wire 10 along the extending direction of the conducting wire 30.

In the connection structure 1 of a carbon nanotube wire, at least part of the conducting wire 30 other than the region located at the penetrating part 31 includes the winding part 32 wound around the outer circumferential surface 11 of the CNT wire 10, and so when the CNT wire 10 is soldered to the substrate 20, the solder 41 accumulates at the winding part 32. Therefore, the solder 41 is surely applied to the desired joint 40 and the vicinity of the joint 40, and the solder 41 can more smoothly flow into the CNT wire 10 along the extending direction of the conducting wire 30. Since the solder 41 is more likely to accumulate at the winding part 32, it is possible to prevent the solder 41 from getting wet and spreading over regions other than the desired joint 40 and in the vicinity of the joint 40.

Although the ratio of the cross-sectional area of the conducting wire 30 in the penetrating part 31 to the cross-sectional area of the CNT wire 10 on a cross section orthogonal to the longitudinal direction of the CNT wire 10 is not particularly limited, the ratio is preferably 5% or more and 99% or less, more preferably 10% or more and 99% or less, and particularly preferably 30% or more and 50% or less. Especially when the cross-sectional area of the conducting wire 30 is 30% or more and 50% or less, the performance of electrical connectivity and mechanical connectivity reaches a peak, which is also preferable from a standpoint of lightweight and costs, too. Since the solder 41 surely flows into the CNT wire 10 along the extending direction of the conducting wire 30 and connection reliability between the CNT wire 10 and the substrate 20 surely improves, the lower limit value of the cross-sectional area is preferably 10%, and particularly preferably 30% from a standpoint of electrical connectivity. On the other hand, the upper limit value of the ratio of the cross-sectional area is preferably 99% from a standpoint of handling performance when forming the penetrating part 31 and the winding part 32, and particularly preferably 50% from a standpoint of achieving balance between lightweight and electrical connectivity. Note that the above-described ratio of the cross-sectional area is calculated by (cross-sectional area in radial direction of conducting wire 30 in penetrating part 31/cross-sectional area in radial direction of CNT wire 10) times 100. By setting the ratio of cross-sectional areas to the above-described value, it is possible to secure the surface area of the conducting wire 30 penetrating the carbon nanotube wire and facilitate penetration of solder. As a result, it is possible to obtain a connection structure of a carbon nanotube wire having excellent electrical connectivity and mechanical connectivity.

Figure 4:
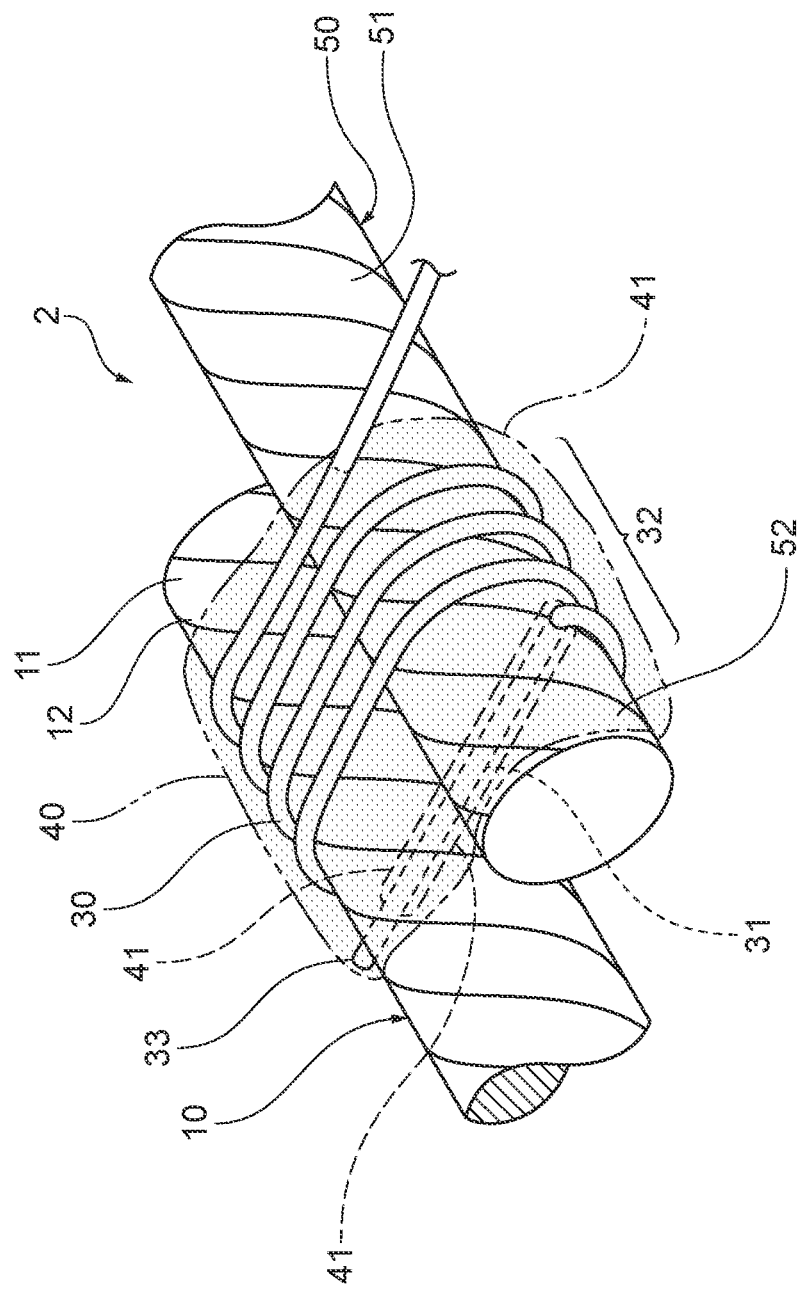
FIG. 4 is an explanatory view of a connection structure in which the carbon nanotube wire, a connection structure according to a second embodiment of the present disclosure, is connected to another carbon nanotube wire.

A connection structure of a carbon nanotube wire according to a second embodiment of the present disclosure will be described hereinafter using the accompanying drawings. Note that since the connection structure of a carbon nanotube wire according to the second embodiment and the connection structure of a carbon nanotube wire according to the first embodiment share main components, components identical to the components of the connection structure of a carbon nanotube wire according to the first embodiment will be described using identical reference numerals. FIG. 4 is an explanatory view of a connection structure in which the carbon nanotube wire, the connection structure according to the second embodiment of the present disclosure, is connected to another carbon nanotube wire.

In the connection structure of a carbon nanotube wire according to the first embodiment, the connection target, which is a conductive member, is a substrate, whereas as shown in FIG. 4, in the connection structure 2 of a carbon nanotube wire according to the second embodiment, the connection target, which is a conductive member, is another CNT wire 50. In the connection structure 2 of a carbon nanotube wire, one end portion 12 of the CNT wire 10 is connected to one end portion 52 of the other CNT wire 50 and a joint 40 between the CNT wire 10 and the other CNT wire 50 is formed. In the connection structure 2 of carbon nanotube wires, the extending direction from the one end portion 12 of the CNT wire 10 to the other end portion (not shown) is different from the extending direction from the one end portion 52 of the other CNT wire 50 to the other end portion (not shown).

In the joint 40, one end portion 12 of the CNT wire 10 and one end portion 52 of the other CNT wire 50 are arranged in parallel. In the joint 40, one end portion 12 of the CNT wire 10 and one end portion 52 of the other CNT wire 50 are connected with the outer circumferential surface 11 of the CNT wire 10 in contact with the outer circumferential surface 51 of the other CNT wire 50.

The joint 40 is provided with the penetrating part 31 of the conducting wire 30. The penetrating part 31 of the conducting wire 30 is formed along a cross section orthogonal to the longitudinal directions of the regions of the CNT wire 10 and the other CNT wire 50 arranged in parallel. By penetrating the conducting wire 30 through the CNT wire 10 and the other CNT wire 50 in radial directions of the CNT wire 10 and the other CNT wire 50, the penetrating part 31 of the conducting wire 30 is formed along the cross section orthogonal to the longitudinal directions of the region of the CNT wire 10 and the other CNT wire 50 arranged in parallel. In the connection structure 2 of carbon nanotube wires, the conducting wire 30 penetrates along a center line of the cross section orthogonal to the longitudinal directions of the one end portion 12 of the CNT wire 10 and one end portion 52 of the other CNT wire 50 arranged in parallel. That is, the conducting wire 30 has the penetrating part 31 continuous to both the CNT wire 10 and the other CNT wire 50.

By piercing the conducting wire 30 into the regions of the CNT wire 10 and the other CNT wire 50 arranged in parallel in the connection structure 2 of carbon nanotube wires, it is possible to penetrate the conducting wire 30 through the CNT wire 10 and the other CNT wire 50 and form the penetrating part 31. One penetrating part 31 is also formed in the connection structure 2 of carbon nanotube wires by piercing one conducting wire 30 into the CNT wire 10 and the other CNT wire 50. Note that like the CNT wire 10, the other CNT wire 50 is a stranded wire formed by twisting a plurality of CNT elemental wires.

When lengthening the CNT wire with the one end portion 12 of the CNT wire 10 soldered to the one end portion 52 of the other CNT wire 50, the solder 41 penetrates the penetrating part 31 along the conducting wire 30. Therefore, the solder 41 extends from the inside of the CNT wire 10 to the inside of the other CNT wire 50 along the penetrating part 31.

As shown in FIG. 4, at least part of the conducting wire 30 other than the region located at the penetrating part 31 is wound around the perimeters of the CNT wire 10 and the other CNT wire 50 along the circumferential direction and the winding part 32 is formed. The winding part 32 is provided in the region where the CNT wire 10 and the other CNT wire 50 are arranged in parallel. In the winding part 32, the conducting wire 30 is wound so as to bundle the one end portion 12 of the CNT wire 10 and the one end portion 52 of the other CNT wire 50. In the connection structure 2 of carbon nanotube wires, the penetrating part 31 of the conducting wire 30 and the winding part 32 are also mutually continuous, and the winding part 32 is provided in the vicinity of the penetrating part 31.

With the winding part 32 of the conducting wire 30 formed, the connection structure 2 of carbon nanotube wires also has an aspect that part of the conducting wire 30 protrudes from a portion of the CNT wire 10 not facing the other CNT wire 50. That is, the conducting wire 30 protrudes from the outer circumferential surface 11 of the CNT wire 10 at the winding part 32 of the conducting wire 30. In FIG. 4, there is also an aspect that the tip portion 33 of the conducting wire 30 located at the penetrating part 31 extends outward from the outer circumferential surface 11 of the CNT wire 10, and so, part of the conducting wire 30 protrudes from the part of the CNT wire 10 not facing the other CNT wire 50.

In the connection structure 2 of carbon nanotube wires, the winding part 32 also has the function to accumulate the solder 41 when the CNT wire 10 is soldered to the other CNT wire 50. Therefore, the solder 41 can more smoothly flow into the CNT wire 10 and the other CNT wire 50 along the extending direction of the conducting wire 30. Furthermore, in the connection structure 2 of carbon nanotube wires, the winding part 32 has a function to further improve joint strength of the joint 40 between the CNT wire 10 and the other CNT wire 50. Moreover, in the connection structure 2 of carbon nanotube wires, the conducting wire 30 has a function to directly connect the CNT wire 10 and the other CNT wire 50, and can thereby improve tensile strength between the CNT wire 10 and the other CNT wire 50.

Although a width of the winding part 32 in the longitudinal direction of the CNT wire 10 is not particularly limited, a lower limit value of the width is preferably 0.3 mm or more from a standpoint of ensuring soldering between the CNT wire 10 and the other CNT wire 50, and particularly preferably 0.5 mm or more from a standpoint of further improving joint strength of the joint. On the other hand, an upper limit value of the width of the winding part 32 is preferably 3.0 mm or less from a standpoint of weight reduction of the joint 40, and particularly preferably 2.0 mm or less.

According to the connection structure 2 of carbon nanotube wires, the connection structure 2 is provided with the penetrating part 31 of the conducting wire 30 with high solder wettability formed along a cross section orthogonal to the longitudinal direction of the CNT wire 10, which is a stranded wire, and the longitudinal direction of the other CNT wire 50, which is a connection target, the solder 41 penetrates the penetrating part 31 along the conducting wire 30, and it is thereby possible to easily create an inside with high solder wettability (that is, a gap formed between an outer circumference of the conducting wire 30, the CNT wire 10 and the other CNT wire 50) in the CNT wire 10 and the other CNT wire 50. Therefore, when connecting the CNT wire 10 and the other CNT wire 50, the solder 41 flows into the CNT wire 10 and the other CNT wire 50 along the penetrating part 31 of the conducting wire 30, that is, in radial direction of the CNT wire 10 and the other CNT wire 50, firmly connecting the solder 41 and the conducting wire 30, and the CNT wire 10 and the other CNT wire 50 respectively, and as a result, firmly connecting the CNT wire 10 and the other CNT wire 50. From above, in the connection structure 2 of carbon nanotube wires, by selecting a position of the penetrating part 31 of the conducting wire 30 in the CNT wire 10 as appropriate, it is possible to firmly connect the CNT wire 10 to the other CNT wire 50 at a desired region of the CNT wire 10 with simple operation and it is possible to easily lengthen the CNT wire. In the connection structure 2 of carbon nanotube wires, it is also possible to obtain a connection structure of a carbon nanotube wire including the joint 40 between the CNT wire 10 and the other CNT wire 50 having excellent electrical connectivity and mechanical connectivity.

A connection structure of a carbon nanotube wire according to a third embodiment of the present disclosure will be described using the accompanying drawings hereinafter. Note that since the connection structure of a carbon nanotube wire according to the third embodiment and the connection structures of carbon nanotube wires according to the first and second embodiments share main components, components identical to the components of the connection structures of carbon nanotube wires according to the first and second embodiments will be described using identical reference numerals. Note that FIG. 5 is an explanatory view of an aspect in which a conducting wire is wound around a perimeter of a carbon nanotube wire in which a penetrating part of the conducting wire to be used for the connection structure according to the third embodiment of the present disclosure is formed.

Figure 5:
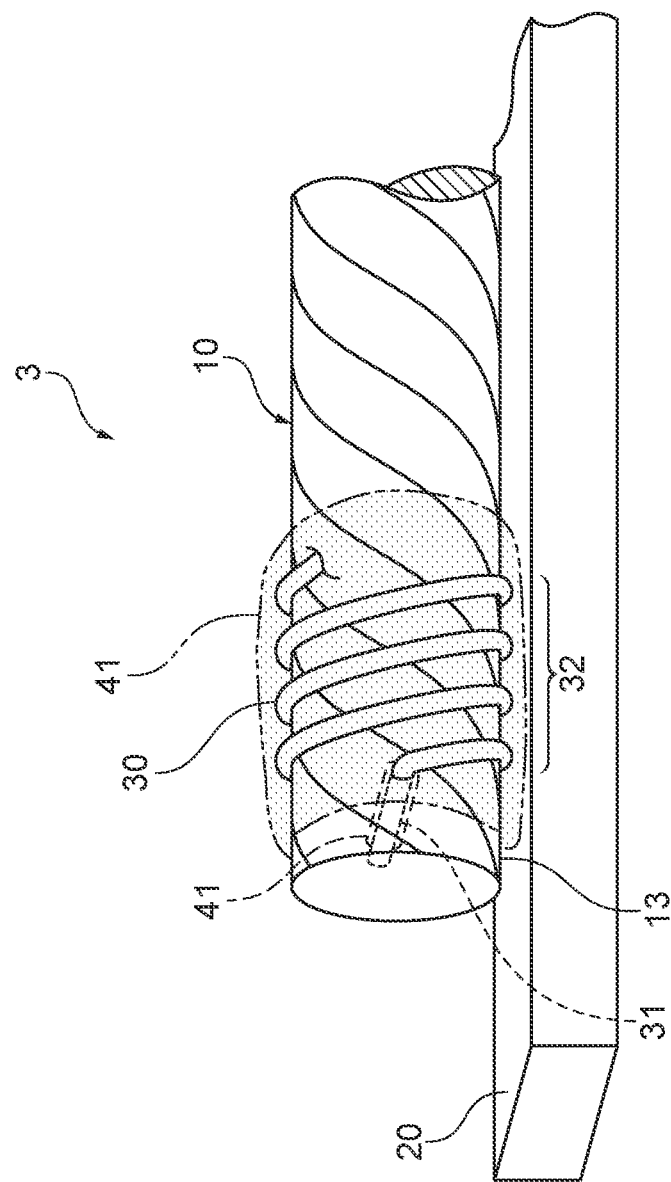
FIG. 5 is an explanatory view illustrating an aspect that a conducting wire is wound around a perimeter of a carbon nanotube wire in which a penetrating part of the conducting wire is formed, to be used for a connection structure according to a third embodiment of the present disclosure.

As shown in FIG. 5, in the connection structure 3 of a carbon nanotube wire according to the third embodiment, a penetrating part 31 of the conducting wire 30 and a winding part 32 are formed at a tip portion 13 of the CNT wire 10. In the connection structure 3 of a carbon nanotube wire, the connection target of the CNT wire 10 is, for example, a substrate or another CNT wire (substrate 20 in FIG. 5) and the tip portion 13 of the CNT wire 10 is soldered to the connection target.

Since the winding part 32 is formed at the CNT wire 10, the outer circumference of the CNT wire 10 is held by the winding part 32 and a pressure is applied from the outer circumferential surface, and so it is possible to prevent a reduction in the area of contact between CNTs and prevent a reduction in conductivity. At this time, it is preferable that the pressure be substantially uniformly applied over the whole surface of the outer circumferential surface of the CNT wire 10 on which the winding part 32 is formed. Examples of the method for applying the pressure over the whole surface of the winding part 32 substantially uniformly include increasing the number of turns of the winding part 32, setting a start point and an end point of the winding part 32 at positions parallel to the longitudinal direction of the CNT wire 10.

Other embodiments of the connection structure of a carbon nanotube wire of the present disclosure will be described hereinafter. Although the connection structure of a carbon nanotube wire in the above-described embodiments is provided with the winding part of the conducting wire, the winding part may not be provided as long as the penetrating part of the conducting wire is formed. The connection structure of a carbon nanotube wire in the above-described embodiments is provided with a penetrating part and a winding part using one conducting wire. Instead, however, the connection structure may be provided with a penetrating part and a winding part using a plurality of conducting wires. Therefore, a plurality of penetrating parts of the conducting wire may be provided. Since a plurality of penetrating parts of the conducting wire are provided, the surface area of the conducting wire in the penetrating part increases further and solder penetrates more easily. The plurality of penetrating parts of the conducting wire may also be formed on one cross section having components orthogonal to the longitudinal direction of the CNT wire or the plurality of penetrating parts of the conducting wire may also be formed on a plurality of cross sections having components orthogonal to the longitudinal direction of the CNT wire. Since the plurality of penetrating parts of the conducting wire are formed on one cross section having components orthogonal to the longitudinal direction of the CNT wire, the region of the joint to which solder is applied becomes narrower, and it is possible to form a compact connection structure of a carbon nanotube wire. Since the plurality of penetrating parts of the conducting wire are formed on a plurality of cross sections having components orthogonal to the longitudinal direction of the CNT wire, the region of the joint to which solder is applied is widened, and the joint strength of the joint is further improved.

In the connection structure of a carbon nanotube wire in the above-described embodiments, although the conducting wire of the winding part is wound at a predetermined interval in the longitudinal direction of the CNT wire. Instead, however, the conducting wire may be wound without any predetermined interval with the neighboring conducting wires in contact with each other.

EXAMPLES

Examples of the present disclosure will be described hereinafter, but the present disclosure will not be limited to aspects of the following Examples.

First, CNTs are created and CNT elemental wires are created from a plurality of CNTs obtained. Next, a stranded wire of CNT is created by twisting the plurality of CNT elemental wires obtained. The CNT can be created using methods such as a floating catalyst method (Japanese Patent Publication No. 5819888), or a substrate method (Japanese Patent Publication No. 5590603). The CNT elemental wire can be created using methods such as dry spinning (Japanese Patent Publication No. 5819888, Japanese Patent Publication No. 5990202, Japanese Patent Publication No. 5350635), wet spinning (Japanese Patent Publication No. 5135620, Japanese Patent Publication No. 5131571, Japanese Patent Publication No. 5288359), liquid crystal spinning (National Publication of International Patent Application No. 2014-530964).

Example 1

Two CNT wires (diameter 0.2 mm) were prepared by twisting seven elemental wires of CNT and end portions of the two CNT wires were arranged in parallel. One copper wire (diameter 0.025 mm) was prepared as the conducting wire. The copper wire was pierced into a region where the two CNT wires were arranged in parallel and a penetrating part of the copper wire was formed in the two CNT wires. The perimeters of the two CNT wires were wound with the copper wire in which the penetrating part was formed so as to bundle the two CNT wires, a winding part was thereby formed and a connection structure was created. A width of the winding part was set to 1 mm.

Example 2

A connection structure was created using a method similar to the method in Example 1 except in that two copper wires were used as the conducting wire instead of the one copper wire and the two copper wires were pierced into the cross section orthogonal to the longitudinal direction of the CNT wire so that the two copper wires were substantially orthogonal.

Example 3

A connection structure was created using a method similar to the method in Example 1 except in that a copper wire having a diameter of 0.080 mm was used instead of the copper wire having a diameter of 0.025 mm.

Example 4

A connection structure was created using a method similar to the method in Example 3 except in that two copper wires were used instead of one copper wire and the two copper wires were pierced into the cross section orthogonal to the longitudinal direction of the CNT wire so that the two copper wires were substantially orthogonal.

Example 5

A connection structure was created using a method similar to the method in Example 1 except in that a copper wire having a diameter of 0.250 mm was used instead of the copper wire having a diameter of 0.025 mm.

Example 6

A connection structure was created using a method similar to the method in Example 5 except in that two copper wires were used instead of one copper wire and the two copper wires were pierced into the cross section orthogonal to the longitudinal direction of the CNT wire so that the two copper wires were substantially orthogonal.

Solder was applied to the penetrating part and the winding part to connect the two CNT wires, the CNT wires were linearly lengthened, and a sample of the connection structure of a carbon nanotube wire of the present disclosure was created. In Examples 1 to 6, lead-based solder was used as the solder. As a reference example, one unconnected CNT wire (CNT wire (diameter 0.2 mm) obtained by twisting seven elemental wires of CNT) was used.

Evaluation items and evaluation methods are as follows:
(1) Ratio of cross-sectional area in radial direction of conducting wire to cross-sectional area in radial direction of carbon nanotube wire in penetrating part of the connection structure of carbon nanotube wire A ratio of a cross-sectional area in radial direction of a conducting wire to a cross-sectional area in radial direction of a carbon nanotube wire in the penetrating part of the connection structure of a carbon nanotube wire was calculated by extracting the cross section of the connection structure of a carbon nanotube wire and calculating the cross-sectional area in radial direction of the conducting wire in the penetrating part/the cross-sectional area in radial direction of the CNT wire based on a SEM-acquired image.

(2) Resistance value

A resistance value of the connection structure of a carbon nanotube wire was measured by connecting the connection structure of a carbon nanotube wire to a low voltage source meter (manufactured by Keithley Instruments & Products, apparatus name "2401 SourceMeter") and a digital multimeter (manufactured by Keithley Instruments & Products, apparatus name "2000 multimeter") and using a four-terminal method.

(3) Tensile strength

A tester grasped and pulled both end portions of a sample of the connection structure of a carbon nanotube wire and visually observed a connection situation of the sample.
○: The joint is not disconnected by pulling the joint and there is no change in the connection structure.
Δ: When pulled, the connection structure is changed but the electrical connection can be maintained.
x: When pulled, the joint falls apart.

The evaluation results are shown in Table 1 below.

TABLE 1

|  | Reference example | Example 1 | Example 2 | Example 3 | Example 4 | Example 5 | Example 6 |
|---|---|---|---|---|---|---|---|
| Ratio of sectional area of copper wire to sectional area of carbon nanotube (%) | — | 5 | 10 | 17 | 32 | 50 | 84 |
| Resistance value (Ω/cm) | 0.0996 | 0.197 | 0.174 | 0.170 | 0.144 | 0.141 | 0.141 |
| Tensile strength | — | Δ | ○ | ○ | ○ | ○ | ○ |

From Table 1 above, Examples 1 to 6, which are connection structures in which two CNT wires are connected by solder all show that the resistance values can be reduced to the same level as the resistance value of one CNT wire and demonstrate excellent electrical connectivity. Example 1 to 6 also show that tensile strength is also good, mechanical connectivity is also excellent, and especially in Examples 2 to 6 in which the ratio of the cross-sectional area of the copper wire to the cross-sectional area of the carbon nanotube is 10% or more, mechanical connectivity is further excellent. Furthermore, in Examples 4 to 6 in which the ratio of the copper wire is 30% or more, a significant reduction in resistance value has been observed.

Even when the joints in Examples 1 to 6 were connected to the substrate by solder, both mechanical strength and electrical connectivity were excellent.

What is claimed is:

1. A connection structure of a carbon nanotube wire, comprising:
a carbon nanotube wire formed by twisting and bundling carbon nanotube aggregates;
a connection target to which the carbon nanotube wire is connected;
a conducting wire with higher solder wettability than the carbon nanotube wire;
a penetrating part of the conducting wire formed along a cross section having a component orthogonal to a longitudinal direction of the carbon nanotube wire; and
solder that connects the carbon nanotube wire and the connection target; wherein
the solder penetrates the penetrating part formed along the conducting wire.

2. The connection structure of a carbon nanotube wire according to claim 1, wherein the connection target is a conductive member.

3. The connection structure of a carbon nanotube wire according to claim 2, wherein a part of the conducting wire protrudes from a part of the carbon nanotube wire not facing the connection target.

4. The connection structure of a carbon nanotube wire according to claim 2, wherein the conductive member is a substrate comprising a metal member or another carbon nanotube wire.

5. The connection structure of a carbon nanotube wire according to claim 4, wherein a part of the conducting wire protrudes from a part of the carbon nanotube wire not facing the connection target.

6. The connection structure of a carbon nanotube wire according to claim 1, wherein a part of the conducting wire protrudes from a part of the carbon nanotube wire not facing the connection target.

7. The connection structure of a carbon nanotube wire according to claim 6, wherein
the connection target is another carbon nanotube wire,
the connection structure of the carbon nanotube wire comprises a joint where an outer circumferential surface of one end portion of the carbon nanotube wire is in contact with an outer circumferential surface of one end portion of the other carbon nanotube wire, and
in the joint, the penetrating part of the conducting wire is formed along a cross section having a component orthogonal to a longitudinal direction of the carbon nanotube wire and the other carbon nanotube wire.

8. The connection structure of a carbon nanotube wire according to claim 7, wherein at least part of the conducting wire other than a region located at the penetrating part is wound around perimeters of the carbon nanotube wire and the other carbon nanotube wire.

9. The connection structure of a carbon nanotube wire according to claim 6, wherein at least a part of the conducting wire other than a region located at the penetrating part is wound around a perimeter of the carbon nanotube wire.

10. The connection structure of a carbon nanotube wire according to claim 6, wherein a ratio of a cross-sectional area of the conducting wire at the penetrating part to a cross-sectional area of the carbon nanotube wire on a cross section having a component orthogonal to the longitudinal direction of the carbon nanotube wire is 5% or more and 99% or less.

11. The connection structure of a carbon nanotube wire according to claim 1, wherein
the connection target is another carbon nanotube wire,
the connection structure of the carbon nanotube wire comprises a joint where an outer circumferential surface of one end portion of the carbon nanotube wire is in contact with an outer circumferential surface of one end portion of the other carbon nanotube wire, and in the joint, the penetrating part of the conducting wire is formed along a cross section having a component orthogonal to a longitudinal direction of the carbon nanotube wire and the other carbon nanotube wire.

12. The connection structure of a carbon nanotube wire according to claim 11, wherein at least a part of the conducting wire other than a region located at the penetrating part is wound around perimeters of the carbon nanotube wire and the other carbon nanotube wire.

13. The connection structure of a carbon nanotube wire according to claim 1, wherein at least a part of the conducting wire other than a region located at the penetrating part is wound around a perimeter of the carbon nanotube wire.

14. The connection structure of a carbon nanotube wire according to claim 1, wherein a ratio of a cross-sectional area of the conducting wire at the penetrating part to a cross-sectional area of the carbon nanotube wire on a cross section having a component orthogonal to the longitudinal direction of the carbon nanotube wire is 5% or more and 99% or less.

* * * * *